United States Patent [19]

Takahashi et al.

[11] Patent Number: 5,442,003
[45] Date of Patent: Aug. 15, 1995

[54] PARA-ARAMID DOPE OF LOW DEGREE OF POLYMERIZATION, PARA-ARAMID FIBER AND PARA-ARAMID PULP PRODUCED THEREFROM AND PROCESSES FOR PRODUCING THE SAME

[75] Inventors: Tsutomu Takahashi, Ibaraki; Hiroyuki Sato, Tsukuba, both of Japan

[73] Assignees: Sumitomo Chemical Company, Ltd., Osaka, Japan; Akzo N.V., Arnhem, Netherlands

[21] Appl. No.: 67,000

[22] Filed: May 25, 1993

[30] Foreign Application Priority Data

May 28, 1992 [JP] Japan ................... 4-136733

[51] Int. Cl.⁶ ............ C08K 5/3415; C08K 5/21; C08K 5/20; C08K 3/16
[52] U.S. Cl. .................... 524/104; 524/241; 524/233; 524/401; 524/436; 264/142; 264/143; 264/147; 264/184; 264/255; 264/DIG.47
[58] Field of Search ............. 524/104, 211, 233, 401, 524/436; 264/142, 143, 147, 184, 205, DIG. 47

[56] References Cited

U.S. PATENT DOCUMENTS

| | | | |
|---|---|---|---|
| Re. 30,352 | 7/1980 | Kwolek | 524/104 |
| 3,673,143 | 6/1972 | Bair et al. | 524/104 |
| 3,950,473 | 4/1976 | Iwahori et al. | 264/DIG. 47 |
| 4,579,895 | 4/1986 | Cuidard et al. | 524/104 |
| 4,836,507 | 6/1989 | Yang | 264/184 |
| 4,876,040 | 10/1989 | Park et al. | |
| 4,959,453 | 9/1990 | Sweeny | 524/104 |
| 4,971,744 | 11/1990 | Park et al. | |
| 5,021,123 | 6/1991 | Sweeny | 162/146 |
| 5,028,372 | 7/1991 | Brierre et al. | |
| 5,047,500 | 9/1991 | Park et al. | |

FOREIGN PATENT DOCUMENTS

| | | |
|---|---|---|
| 0246732 | 11/1987 | European Pat. Off. |
| 0348996 | 1/1990 | European Pat. Off. |
| 0470634 | 2/1992 | European Pat. Off. |
| 47-2489 | 1/1972 | Japan . |
| 50-8474 | 4/1975 | Japan . |
| 50-12485 | 5/1975 | Japan . |
| 50-35941 | 11/1975 | Japan . |
| 57-10885 | 3/1982 | Japan . |
| 61-103926 | 5/1986 | Japan . |
| 61-42004 | 9/1986 | Japan . |
| 62-45716 | 2/1987 | Japan . |
| 62-162013 | 7/1987 | Japan . |
| 2242912 | 9/1990 | Japan . |
| 1259788 | 1/1972 | United Kingdom . |
| 1283064 | 7/1972 | United Kingdom . |
| 1283065 | 7/1972 | United Kingdom . |
| 1283066 | 7/1972 | United Kingdom . |

*Primary Examiner*—Peter A. Szekely
*Attorney, Agent, or Firm*—Stevens, Davis, Miller & Mosher

[57] ABSTRACT

A para-aramide dope of low degree of polymerization exhibiting an optical anisotropy containing 4-10% by weight of a para-aramide having an inherent viscosity of 1.0-2.5 dl/g and 2-10% by weight of an alkali metal chloride or an alkaline earth metal chloride in a polar amide solvent;

a para-aramide fiber obtained by spinning the above-mentioned para-aramide dope of low degree of polymerization;

a para-aramide pulp obtained by cutting the above-mentioned para-aramide fiber into a short fiber, mechanically fibrillating the short fiber with a high shearing force and thereafter drying the fibrillated short fiber;

a process for producing a para-aramide fiber which comprises adding 0.94-0.99 mole of a para-oriented aromatic dicarboxylic acid halide to 1.00 mole of a para-oriented aromatic diamine in a polar amide solvent in which 2-10% by weight of an alkali metal chloride or an alkaline earth metal chloride is dissolved, carrying out a polymerization at a temperature of −20° C. to 50° C. to form a para-aramide dope of low degree of polymerization exhibiting an optical anisotropy and having a para-aramide concentration of 4-10% by weight, and spinning the dope; and a process for producing a para-aramide pulp which comprises cutting the above-mentioned para-aramide fiber into a short fiber, mechanically fibrillating the short fiber with a high shearing force, and thereafter drying the fibrillated short fiber.

13 Claims, No Drawings

PARA-ARAMID DOPE OF LOW DEGREE OF POLYMERIZATION, PARA-ARAMID FIBER AND PARA-ARAMID PULP PRODUCED THEREFROM AND PROCESSES FOR PRODUCING THE SAME

BACKGROUND OF THE INVENTION

1. Field of the Invention

The present invention relates to a para-aramid fiber, a para-aramid pulp and processes for producing the same. In particular, the invention relates to a dope constituted of a para-aramid of low degree of polymerization, a para-aramid fiber and a para-aramid pulp produced from said dope, and processes for producing these materials.

2. Related Art

Para-oriented aromatic amides which are condensation polymers of a para-oriented aromatic diamine and a para-oriented aromatic dicarboxylic acid halide (hereinafter abbreviated to "para-aramids") have hitherto been known to be useful in various fields such as fiber, pulp and the like because of their high strength, high elastic modulus and high heat resistance.

As a typical member of para-aramid, poly(para-phenylene terephthalamide) (hereinafter abbreviated to PPTA) can be referred to.

Hitherto, PPTA pulp has been produced in the following manner. Thus, PPTA is produced by carrying out a solution polymerization reaction in a polar amide solvent such as N-methyl-2-pyrrolidone (hereinafter abbreviated to NMP) or the like. The PPTA is re-precipitated, neutralized, washed with water and dried, and once isolated as a polymer. Then, the polymer is dissolved in a solvent and made into a PPTA fiber by the process of wet spinning. In this step, concentrated sulfuric acid is used as the solvent of spinning dope, because PPTA is not readily soluble in organic solvents. This spinning dope shows an optical anisotropy as mentioned in Japanese Patent Application KOKOKU No. 50-8474.

On the other hand, in some limited cases, a solution of para-aramid in an organic solvent also exhibits an optical anisotropy. Thus, Japanese Patent Application KOKOKU No. 50-35941 discloses an optically anisotropic spinning dope exemplified by a solution of 2,6-dichloro-paraphenylene 2,6-naphthalamide polymer in N,N-dimethylacetamide/lithium chloride system and the like. Japanese Patent Application KOKOKU No. 50-12485 discloses an optically anisotropic spinning dope prepared by dissolving PPTA which is a typical para-aramid in hexamethylphosphoramide/N-methylpyrrolidone/lithium chloride system. The former spinning dope is characterized by using a monomer having an affinity to organic solvents, while the latter spinning dope is characterized by using hexamethylphosphoramide having a high ability to dissolve para-aramid.

Industrially, PPTA fiber is produced from a spinning dope using concentrated sulfuric acid as a solvent, considering the performances as a long fiber, particularly strength and stiffness.

According to the prior process, a pulp is produced by mechanically cutting a PPTA fiber, dispersing the cut fiber in water and fibrillating the dispersed fiber by a mechanical shearing means such as beating or the like, followed by filtration and drying. In such prior process, the steps of polymerization, spinning and pulp making are completely independent of one another. That is, the step of polymerization uses a polar amide solvent, the step of spinning uses concentrated sulfuric acid as solvent, and the step of pulp making uses water as a dispersing medium. This is economically disadvantageous as an industrial process.

With the aim of rationalizing the prior process, there have been proposed up to date various processes for directly spinning a yarn or making a pulp from a liquid polymer dope without separating the step of polymerization and the step of spinning from each other.

Thus, Japanese Patent Application KOKAI No. 2-242912 proposes a process which comprises subjecting a para-oriented aromatic diamine and a para-oriented aromatic dicarboxylic acid halide to a polycondensation reaction at an equimolar ratio in a polar amide solvent, gelling the polymer solution which is in a stage just before completion of the polymerization and exhibits an optical anisotropy while orienting and making flow the solution, thereafter cutting the gel into pieces, and making the pieces into a pulp by using water as a coagulant while applying thereto a shearing force. In this process, the polymerization can be made to progress to an additional extent by maintaining the cut gel pieces at a high temperature, and thereby a high molecular weight para-aramid pulp is formed as a final product.

Japanese Patent Application KOKOKU No. 3-29883 proposes a process for producing a fiber which comprises subjecting an aromatic diamine and an aromatic dicarboxylic acid chloride to a polycondensation reaction at an equimolar ratio in a polar amide solvent in which an inorganic salt is dissolved, and spinning the optically anisotropic polymer solution just before completion of the polymerization, as a spinning dope, in a coagulating bath containing a tertiary amine. The patent gazette makes mention of a process for producing a pulp from the fiber, too. According to the process of the patent, the polymerization further progresses after the spinning by the action of the tertiary amine present in the coagulating solution and finally gives an aramid fiber or pulp of high degree of polymerization.

Apart from the above-mentioned proposals, Japanese patent Application KOKOKU No. 57-10885, Japanese Patent Application KOKOKU No. 61-42004, Japanese Patent Application KOKAI No. 62-45716 and Japanese Patent Application KOKAI (Laid-Open) No. 62-162013 also propose production processes which are fundamentally similar to the processes of the above-mentioned patents. That is, in all these processes, a fiber or a pulp is produced by spinning a polymer solution exhibiting an optical anisotropy which is in a stage just before completion of the polycondensation, or by adding a coagulant solution to the polymer solution, and further applying a high shearing force thereto. In any of these cases, an aromatic diamine and an aromatic dicarboxylic acid halide are subjected to a polycondensation reaction at an equimolar ratio, and a further polymerization is made to progress either in parallel with the spinning or pulp-making or just after the spinning or pulp-making to obtain a high-molecular weight aramid fiber or pulp as a final product.

SUMMARY OF THE INVENTION

The first object of the present invention is to use a para-aramid polymer solution itself as a spinning dope exhibiting an optical anisotropy (hereinafter referred to as "para-aramid dope") in order to make the number of steps much smaller than in the prior processes. Achievement of this object makes it possible to produce an aramid fiber advantageously from the industrial point of view. Further, a para-aramid pulp can be produced from said aramid fiber advantageously from the economical point of view.

According to the prior patent publications mentioned above wherein concentrated sulfuric acid is used, the steps for producing a fiber or a pulp are quite complicated, and the apparatuses therefor are quite expensive because corrosion of the apparatuses by concentrated sulfuric acid must be avoided. Further, the solvent system hexamethylphosphoramide/N-methylpyrrolidone/lithium chloride which is only one solvent system ever reported used for preparing an optically anisotropic PPTA solution is industrially impracticable because hexamethylphosphoramide is carcinogenic.

Further, according to the process mentioned in the above-mentioned prior patent publication, an aromatic diamine and an aromatic dicarboxylic acid halide are subjected to a polycondensation reaction at an equimolar ratio, and a fiber or a pulp is formed from the polymer solution dope exhibiting an optical anisotropy which is in a stage just before completion of the polymerization. In such a process, the polymer solution dope is nothing more than an intermediate taken out in the halfway of the polymerization in essence. Thus, the polymer solution dope is in an unstable state and can readily be converted to a high molecular weight substance or form a gel as a whole. This makes it difficult to obtain a product of uniform quality and to continue the process stably. Thus, at the present stage, the process cannot be said to be industrially successful.

The second object of the present invention is to overcome the above-mentioned faults by providing a process for producing a product of uniform quality stably according to an industrially advantageous and simplified method.

According to the present invention, the following subject matters are provided:

1. A para-aramid dope of low degree of polymerization exhibiting an optical anisotropy containing 4–10% by weight of a para-aramid having an inherent viscosity of 1.0–2.5 dl/g and 2–10% by weight of a halide of an alkali metal or alkaline earth metal in a polar amide solvent;
2. A para-aramid fiber obtained by spinning a para-aramid dope of low degree of polymerization of Paragraph 1;
3. A para-aramid pulp obtained by cutting the para-aramid fiber of Paragraph 2 into a short fiber, fibrillating the short fiber mechanically with a high shearing force, and drying the resulting fibril;
4. A process for producing a para-aramid fiber which comprises adding 0.94–0.99 mole of a para-oriented aromatic dicarboxylic acid halide to 1.00 mole of a para-oriented aromatic diamine in a polar amide solvent in which 2–10% by weight of an alkali metal chloride or an alkaline earth metal chloride is dissolved, carrying out a polymerization at a temperature of −20° to 50° C. to form an optically anisotropic para-aramid dope of low degree of polymerization of which para-aramid concentration is 4–10% by weight, and spinning the dope;
5. A process for producing a para-aramid fiber of paragraph 4, in which 0.95–0.98 mole of a para-oriented aromatic dicarboxylic acid halide is added to 1.00 mole of a para-oriented aromatic diamine; and
6. A process for producing a para-aramid pulp which comprises cutting the para-aramid fiber of Paragraph 4 or 5 into a short fiber, fibrillating the short fiber mechanically with a high shearing force, and thereafter drying the resulting fibril.

The para-aramid dope of low degree of polymerization of the present invention exhibits a stable liquid crystal state at a low temperature. Further, the para-aramid dope of low degree of polymerization of the present invention can be produced advantageously from the industrial point of view in that the production process can be simplified and the process is free from the problem of corrosion of apparatuses by concentrated sulfuric acid as compared with the prior dopes using concentrated sulfuric acid as a solvent.

Further, according to the process of the present invention, the polymer solution can directly be spun, and the product can be made into a pulp in the state of wet yarn, so that the process of production can be greatly simplified as compared with the prior production processes of para-aramid pulp.

The para-aramid fiber produced from the para-aramid dope of low degree of polymerization of the present invention has sufficiently high performances as a starting material of para-aramid pulp. More concretely saying, a para-aramid paper having a long breaking length can be produced from the para-aramid pulp of the present invention. When used as a starting material of friction materials including automobile brake and the like, the retention of filler is good.

DETAILED DESCRIPTION OF THE INVENTION

Next, the present invention will be explained in more detail below.

As used in the present invention, the term "para-aramid" means a substance obtained by a poly-condensation of a para-oriented aromatic diamine and a para-oriented aromatic dicarboxylic acid halide of which recurring units have amide bonds located substantially in the para-oriented or nearly para-oriented opposite positions of aromatic ring, namely in such coaxially or in-parallel arranged positions as those of 4,4'-biphenylene, 1,5-naphthalene, 2,6-naphthalene and the like. Concrete examples of said para-aramid include the aramids of which structures have a poly-para-oriented form or a form close thereto, such as poly(paraphenylene terephthalamide), poly(4,4'-benzanilide terephthalamide), poly(paraphenylene-4,4'-biphenylenedicarboxylic acid amide), poly(paraphenylene-2,6-naphthalenedicarboxylic acid amide) and the like. Among these para-aramids, poly(paraphenylene terephthalamide) is most representative.

As used in the present invention, the term "para-aramid of low degree of polymerization" means the para-aramids of which inherent viscosity is in the range of 1.0 to 2.5 dl/g and preferably 1.5 to 2.2 dl/g, wherein the term "inherent viscosity" used in the present invention is as defined later.

If inherent viscosity of a para-aramid is lower than 1.0 dl/g, the para-aramid cannot exhibit a sufficient mechanical strength as a para-aramid fiber, which results in that the para-aramid pulp obtained therefrom is low in mechanical strength. If the inherent viscosity is higher than 2.5 dl/g, the number of terminal functional groups per unit weight of para-aramid is too small, which suggests that, when used as a pulp, the aramid fiber will be insufficient in the adhesive force to matrix resin. In addition, a solution of such a polymer cannot be a stable liquid polymer dope exhibiting an optical anisotropy, but it forms a gel and makes the spinning work difficult.

The para-aramid dope of low degree of polymerization of the present invention is produced by adding 0.94–0.99 mole, preferably 0.95–0.98 mole of para-oriented aromatic dicarboxylic acid halide to 1.00 mole of a para-oriented aromatic diamine in a polar amide solvent in which 2–10% by weight of alkali metal chloride or alkaline earth metal chloride is dissolved, so that the concentration of para-aramid formed therefrom comes to 4–10% by weight, and carrying out a polymerization at a temperature of −20° C. to 50° C.

Examples of the para-oriented aromatic diamine usable in the present invention include paraphenylenediamine, 4,4'-diaminobiphenyl, 2-methyl-paraphenylenediamine, 2-chloro-paraphenylenediamine, 2,6-naphthalenediamine, 1,5-naphthalenediamine, 4,4'-diaminobenzanilide and the like.

Examples of the para-oriented aromatic dicarboxylic acid halide usable in the present invention include terephthaloyl chloride, 4,4'-benzoyl chloride, 2-chloroterephthaloyl chloride, 2,5-dichloroterephthaloyl chloride, 2-methylterephthaloyl chloride, 2,6-naphthalenedicarboxylic acid chloride, 1,5-naphthalenedicarboxylic acid chloride and the like.

In the present invention, 0.94–0.99 mole, preferably 0.95–0.98 mole of para-oriented aromatic dicarboxylic acid halide is used per 1.00 mole of para-oriented aromatic diamine. Under such a condition, the intended para-aramid dope, aramid fibers and pulp of low degree of polymerization can be obtained. Since the degree of polymerization (expressed by inherent viscosity) of the resulting para-aramid is influenced by water present in the polymerization system, the quantity of water is preferably minimized as possible. The concentration of para-aramid in the liquid polymer dope is controlled so as to come to 4–10% by weight and preferably 5–9% by weight. If the concentration of para-aramid is lower than 4% by weight, the polymer solution is optically isotropic. The fiber obtained from such a polymer solution is low in stiffness and strength, and such a fiber can hardly give a pulp having a sufficient quantity of fibril. If the concentration of para-aramid is higher than 10% by weight, the polymer solution deposits the polymer and cannot be used as a stable dope.

Examples of the chlorides of alkali metal or alkaline earth metal usable in the present invention include lithium chloride and calcium chloride. Per 1.0 mole of the amide group formed by the polycondensation, these chlorides are added preferably in an amount of 0.5–2.5 moles, more preferably in an amount of 0.5–1.5 moles, and further preferably in an amount of 0.7–1.3 moles. If the amount of the chloride is less than 0.5 mole, the formed para-aramid is insufficient in solubility. If the amount of the chloride is more than 2.5 moles, the polymer solution is too high in viscosity and the spinnability of the solution is undesirably low. Thus, the concentration of the chloride of alkali metal or alkaline earth metal adopted in the present invention is 2–10% by weight. If the concentration of chloride is lower than 2% by weight, the para-aramid formed by the polycondensation is insufficient in solubility. If the amount of chloride is higher than 10% by weight, dissolution of the chloride in the polar amide solvent is difficult to achieve.

Concrete examples of the polar amide solvent usable in the present invention include N,N-dimethylformamide, N,N-dimethylacetamide, N-methyl-2-pyrrolidone, N,N,N',N'-tetramethylurea and the like.

In the present invention the polymerization temperature of para-aramid is −20° C. to 50° C., preferably −10° C. to 30° C., and more preferably 0° C. to 25° C. If the polymerization temperature is out of the above-mentioned range, para-aramid is deposited from the polymerization system and the solution becomes unsuitable for use as a spinning dope. In this temperature range, the polymer solution retains a liquid crystal state and exhibits an optical anisotropy, and the fiber produced therefrom by spinning can have sufficient degree of crystallization and degree of crystal orientation. If the polymerization temperature is lower than the above-mentioned range, it causes lowering of polymerization rate and needs a longer time for polymerization which is an disadvantage industrially.

When the polymer solution of the present invention is used for spinning as a spinning dope, the optimum range of draw ratio of spun yarn is not critical, but the ratio varies with the method of spinning. More specifically, the draw ratio is about 0.5–2 in the wet spinning system, and about 2–8 in the dry wet spinning system such as air gap process.

In the present invention, a pulp can be produced according to prior process. Concretely speaking, the para-aramid fiber obtained by spinning is made into a short fiber by stretching, cutting or shearing. Subsequently, the short fiber is fibrillated. The fibrillation requires a mechanical shearing force such as grinding, mashing, knocking or beating, and these procedures may be carried out simultaneously with the short fiber formation, if desired. For the fibrillation, various beaters, HOLLANDERS, refiners and the like conventionally used in the paper-making process are successfully usable.

A preferable process for producing a pulp comprises spinning a para-aramid dope of low degree of polymerization of the present invention to obtain a para-aramid fiber, cutting the para-aramid fiber in the water swollen state to form a short fiber, mechanically fibrillating the short fiber with a high shearing force, and drying the fibril to obtain a pulp. As another process, a process in which the fibrillation is carried out after the drying is also adoptable.

The para-aramid pulp of the present invention is useful as a starting material for para-aramid paper, friction materials including automobile brake, various gaskets and the like.

PREFERRED EMBODIMENT OF THE INVENTION

Next, the present invention will be explained concretely by way of the following examples.

The methods of test and evaluation and criteria of judgement employed in the examples and comparative examples were as follows.

(1) Inherent viscosity

In the present invention, "inherent viscosity" is defined as that measured according to the following method.

Thus, on each of a solution prepared by dissolving 0.5 g of para-aramid polymer in 100 ml of 96–98% sulfuric acid and 96–98% sulfuric acid itself, the flow time was measured at 30° C. with a capillary viscometer. Inherent viscosity was calculated from the flow time ratio according to the following equation:

Inherent viscosity = ln $(T/T_0)/C$ (unit: dl/g) wherein $T$ and $T_0$ represent the flow time of para-aramid/sulfuric acid solution and sulfuric acid itself, respectively, and $C$ represents the concentration (g/dl) of para-aramid in the para-aramid/sulfuric acid solution.

(2) Specific surface area

Specific surface area of para-aramid (m²/g) was measured from the adsorption of nitrogen by the BET specific surface area method, using Flowsorp Model II2300 manufactured by Micromellitics Co.

(3) Tensile strength of single fiber

Measured according to JIS R7601.

(4) Evaluation of optical anisotropy (liquid crystal state)

On a solution having completed a polymerization, whether deposition of a para-aramid polymer was observable or not was examined by means of a fluorescent microscope. When no deposition of polymer was noticeable and the content of polymerization reactor was white and turbid during stirring and showed a transparent appearance during stoppage of stirring, the polymer solution exhibited a liquid crystal state, so that it was judged to have optical anisotropy.

(5) Viscosity measurement of polymer dope

On a solution having completed a polymerization (referred to as "polymer dope"), the frequency dispersion of dynamic viscosity was measured at a temperature of −5° C. by means of RDS-II manufactured by Rheometrix Co. For convenience, the measurements of viscosity were compared in terms of dynamic viscosity at a shearing velocity of 100 radians/second.

(6) Evaluation as a pulp

Main pulp performances were evaluated regarding two uses. Thus, the performance as a para-aramid paper was evaluated by measuring the breaking length according to JIS P8113. As a starting material of friction material including automobile brake, retention of filler was evaluated by the pulp sieving test according to JIS P8207. When used as a starting material of friction material, para-aramid pulp is blended with a composition comprising an inorganic filler, an inorganic short fiber and a phenolic resin. In the absence of para-aramid pulp, said composition is a mere aggregate of powdery substance which will be difficult to handle in the subsequent steps. Owing to the presence of para-aramid, the powdery composition can hold its shape and becomes easy to handle in the step for producing a friction material. For evaluating this important performance of para-aramid, the filler retention property prescribed by JIS P8207 serves as an important index.

EXAMPLES 1 to 5

[Production of poly(paraphenylene terephthalamide) by polymerization]

Polymerization of para(phenylene terephthalamide) was carried out by using a 500 ml separable flask equipped with a stirring wheel, a thermometer, a nitrogen inlet tube and a powder feeding hole.

After sufficiently drying the flask, 300 g of NMP (N-methyl-2-pyrrolidone) and dried calcium chloride of which quantity was as shown in Table 1 were charged and completely dissolved at an inner temperature of 85° C. Then, paraphenylenediamine (hereinafter referred to as PPD) of which quantity was as shown in Table 1 was added and dissolved, and the content of the flask was cooled until the inner temperature reached −6° C. Then, while maintaining the inner temperature at 5° C. or below, terephthaloyl chloride (hereinafter referred to as TPC) of which quantity was as shown in Table 1 was slowly added. After the addition of TPC, the resulting mixture was aged for 2 hours at a temperature of −6° C. to 0° C. to obtain a stable polymer solution, namely a para-aramid dope of low degree of polymerization according to the present invention. The results of the experiment are also shown in Table 1.

COMPARATIVE EXAMPLE 1 and 2

Poly(paraphenylene terephthalamide) was prepared by repeating the procedure of Examples 1 to 5, except that the component ratio was as shown in Table 1. In Comparative Example 2, the polymer solution assumed a state of sludge. The poly(paraphenylene terephthalamide) of Comparative Example 1 was very low in inherent viscosity, which suggested a low mechanical strength of the fiber obtained therefrom.

TABLE 1

|  | Example 1 | Example 2 | Example 3 | Example 4 | Example 5 | Comparative Example 1 | Comparative Example 2 |
| --- | --- | --- | --- | --- | --- | --- | --- |
| CaCl₂ (mole) | 0.135 | 0.135 | 0.135 | 0.135 | 0.160 | 0.135 | 0.135 |
| PPD (mole) | 0.120 | 0.120 | 0.120 | 0.120 | 0.120 | 0.120 | 0.120 |
| TPC (mole) | 0.114 | 0.115 | 0.117 | 0.118 | 0.114 | 0.112 | 0.120 |
| TPC/PPD (mole/mole) | 0.950 | 0.958 | 0.975 | 0.983 | 0.950 | 0.933 | 1.00 |
| Form of polymer solution | Liquid crystal | Liquid crystal | Liquid crystal | Liquid crystal | Liquid crystal | Liquid crystal | Sludge |
| Inherent viscosity (dl/g) | 1.18 | 1.87 | 2.47 | 2.47 | 1.23 | 0.92 | 4.1 |

EXAMPLE 6

[Production of poly(paraphenylene terephthalamide) by polymerization]

Polymerization of para(phenylene terephthalamide) was carried out by using a 500 ml separable flask equipped with a stirring wheel, a thermometer, a nitrogen inlet tube and a powder feeding hole.

After sufficiently drying the flask, 300 g of NMP and dried calcium chloride of which quantity was as shown in Table 2 were charged and completely dissolved at an inner temperature of 85° C. Then, PPD of which quantity was as shown in Table 2 was added and dissolved, and the content of the flask was cooled until the inner temperature reached −6° C. Then, while maintaining the inner temperature at 5° C. or below, terephthaloyl chloride (TPC) of which quantity was as shown in Table 2 was slowly added. After the addition of TPC, the resulting mixture was aged for 2 hours at a temperature of −6° C. to 0° C. to obtain a stable polymer solution, namely a para-aramid dope of low degree of polymerization according to the present invention. The results of the experiment are also shown in Table 2.

EXAMPLE 7 TO 19 AND COMPARATIVE EXAMPLES 3 TO 5

[Production of poly(paraphenylene terephthalamide) by polymerization]

Para(phenylene terephthalamide) was polymerized in the same manner as in Example 6, except that the quantities of charged starting materials were altered, to obtain a para-aramid dope of low degree of polymerization according to the present invention. The results of the experiment are shown in Table 2.

It is apparent from Example 11 that, in the region where a dope having completed the polymerization exhibits an optical isotropy, the liquid crystal state first appears at a polymer concentration of about 4% by weight. In this region, viscosity of polymer dope increases as the polymer concentration increases.

It is apparent from Comparative Example 5 that deposition of polymer begins when polymer concentration has exceeded 10% by weight.

On the other hand, as shown in Examples 6, 9 and 12, the viscosity of polymer dope decreases as the polymer concentration increases in the liquid crystal region. When the inherent viscosity of polymer exceeds 2.5, the polymer dope becomes rubbery and unsuitable for use as a spinning dope as shown in Comparative Example 4.

EXAMPLE 20

[Production of poly(paraphenylene terephthalamide) by polymerization]

Polymerization of para(phenylene terephthalamide) was carried out by using a 5 liters separable flask equipped with a stirring wheel, a thermometer, a nitrogen inlet tube and a powder feeding hole. After sufficiently drying the flask, 3 kg of NMP and 197.0 g (1.775 moles) of calcium chloride were charged and completely dissolved at an inner temperature of 85° C. Then, 97.33 g (0.900 mole) of PPD was added and dissolved, and the content of the flask was cooled until the inner temperature reached −5° C. Then, while maintaining the inner temperature at 5° C. or below, 176.55 g (0.870 mole) of TPC was slowly added. After the addition of TPC, the resulting mixture was aged for 2 hours at a temperature of −6° C. to 0° C. to obtain a stable polymer solution, namely a para-aramid dope of low degree of polymerization. One part of the polymer solution was added to water to separate the polymer as precipitate. The obtained poly(paraphenyleneterephthalamide) had an inherent viscosity of 1.52 dl/g.

EXAMPLES 21 TO 24

[Spinning of poly(paraphenylene terephthalamide)]

Using an aqueous solution containing 20% by weight of NMP as a coagulating solution, the dopes obtained in Examples 16, 18, 19 and 20 were subjected to a spinning test with a syringe type simplified spinning apparatus connected to a constant speed pump. The spinning nozzle had a conical form with a cylindrical tip. The cylindrical part was provided with holes of which L/D was 1. The diameter of the holes was 0.07 mm, and the number of the holes was 100. The draw ratio of the spinning was as shown in Table 3. After the spinning, the single fibers were washed with water and dried. Denier number and tensile strength of the single fiber were measured to obtain the results shown in Table 3.

As compared with a commercially available para-aramid fiber produced by the air gap spinning process from a spinning dope using sulfuric acid as a solvent, the tensile strength of the fiber obtained herein was about 1/5 to 1/2. However, the tensile strength of the fiber obtained herein was comparable to that of general high strength fibers such as high strength nylon and the like.

TABLE 2

| | Formation of charged mixture in polymerization step | | | | | Inherent viscosity of polymer (dl/g) | Polymer concn. in polymer dope (% by wt.) | Properties of polymer dope after completion of polymerization | |
|---|---|---|---|---|---|---|---|---|---|
| | $CaCl_2$ (mol) | PPD (mol) | TPC (mol) | TPC/PPD (mol/mol) | $CaCl_2$/PPD (mol/mol) | $CaCl_2$ concn. (% by wt.) | | | Form | Dynamic viscosity (poise) |
| Example 6 | 0.169 | 0.120 | 0.115 | 0.958 | 1.41 | 5.35 | 1.81 | 8.0 | Liquid crystal | 40 |
| Example 7 | 0.203 | 0.120 | 0.115 | 0.958 | 1.69 | 6.42 | 1.50 | 8.0 | Liquid crystal | 90 |
| Example 8 | 0.211 | 0.150 | 0.144 | 0.960 | 1.41 | 6.54 | 1.66 | 9.8 | Liquid crystal (Note 1) | — |
| Example 9 | 0.127 | 0.090 | 0.087 | 0.960 | 1.41 | 4.01 | 1.85 | 6.0 | Liquid crystal | 100 |
| Example 10 | 0.171 | 0.090 | 0.086 | 0.960 | 1.90 | 5.59 | 1.71 | 6.2 | Liquid crystal | 40 |
| Example 11 | 0.085 | 0.060 | 0.058 | 0.961 | 1.41 | 2.90 | 1.67 | 4.3 | Optically isotropic Liquid crystal | 230 |
| Example 12 | 0.103 | 0.075 | 0.072 | 0.959 | 1.43 | 3.47 | 1.75 | 5.3 | Liquid crystal | 120 |
| Example 13 | 0.148 | 0.105 | 0.101 | 0.963 | 1.41 | 4.68 | 1.88 | 7.2 | Liquid crystal | — |
| Example 14 | 0.135 | 0.120 | 0.114 | 0.950 | 1.13 | 4.38 | 1.18 | 8.1 | Liquid crystal | — |
| Example 15 | 0.135 | 0.120 | 0.116 | 0.967 | 1.13 | 4.37 | 2.08 | 8.2 | Liquid crystal | — |
| Example 16 | 0.109 | 0.090 | 0.086 | 0.956 | 1.87 | 5.51 | 1.97 | 6.2 | Liquid crystal | — |
| Example 17 | 0.232 | 0.105 | 0.101 | 0.956 | 2.21 | 7.37 | 2.09 | 7.0 | Liquid crystal | — |
| Example 18 | 0.169 | 0.090 | 0.088 | 0.956 | 1.87 | 5.51 | 1.79 | 6.2 | Liquid crystal | — |
| Example 19 | 0.169 | 0.090 | 0.086 | 0.956 | 1.87 | 5.51 | 1.63 | 6.2 | Liquid crystal | — |
| Comparative Example 3 | 0.041 | 0.030 | 0.029 | 0.961 | 1.3 | 1.46 | 1.66 | 2.2 | Optically isotropic | 30 |
| Comparative Example 4 | 0.135 | 0.120 | 0.119 | 0.992 | 1.13 | 4.37 | 2.58 | 8.3 | Rubbery | |
| Comparative Example 5 | 0.203 | 0.180 | 0.175 | 0.972 | 1.13 | 6.17 | 1.38 | 11.6 | Polymer deposited | |

(Note 1) A small quantity of polymer was deposited.

TABLE 3

| Example No. | Example No. of polymerization | Mean fineness of single fiber (d) | Tensile strength of single fiber (g/d) | Draw ratio at the time of spinning | Mode of spinning |
| --- | --- | --- | --- | --- | --- |
| 21 | 16 | 2.2 | 9.4 | 1.5 | Complete wet spinning |
| 22 | 18 | 2.3 | 7.7 | 1.2 | Complete wet spinning |
| 23 | 19 | 2.1 | 8.8 | 1.2 | Complete wet spinning |
| 24 | 20 | 3.0 | 5.4 | 1.0 | Complete wet spinning |

EXAMPLE 25

[Production of poly(paraphenylene terephthalamide) pulp]

A wet yarn of poly(paraphenylene terephthalamide) produced in Example 21 was cut into a length of about 30 mm and made into a pulp by means of PF1 mill manufactured by Kumagaya Riki Kogyo K. K. The wet pulp of poly(paraphenylene terephthalamide) thus obtained was dried and its specific surface area was measured. The result was about 2 m$^2$/g.

REFERENTIAL EXAMPLE 1

[Production and evaluation of poly(paraphenylene terephthalamide) paper]

The pulp obtained in Example 25 was made into paper in the state of wetness by means of Standard Rectangular Sheet Machine manufactured by Kumagaya Riki Kogyo K. K. and then dried to obtain a paper made of para-aramid pulp. The para-aramid pulp paper had a thickness of 100 μm, and its breaking length was 0.11 km. In the state of wetness, the content of solid component (para-aramid)in the pulp was about 20% by weight as revealed from measurment of weights before and after drying. For comparison, a para-aramid pulp paper was made from the known para-aramid pulp available on the market by the use of the same paper-making machine as above. This comparative para-aramid pulp paper had a breaking length of 0.08 km. As compared therewith, the para-aramid paper of the present invention showed no inferiority in paper strength.

REFERENTIAL EXAMPLE 2

[Evaluation of poly(paraphenylene terephthalamide) pulp as a brake material]

A poly(paraphenylene terephthalamide) pulp was prepared by repeating the procedures of Examples 21 and 25. After dryness, the pulp thus obtained had a specific surface area of 3 m$^2$/g. Then, performance of the dry pulp as a starting material for production of automobile brake was evaluated. The brake-producing composition had the following component ratio:

para-aramid pulp: 2.16 parts by weight
rock wool: 24.84 parts by weight
barium sulfate: 35.1 parts by weight
kaolinite: 27.1 parts by weight
powdery phenolic resin: 10.8 parts by weight.

These ingredients were mixed together by a dry method. Then, the filler retention of the mixture thus obtained was evaluated according to JIS P8207. As the result, the filler retention was 62% in the para-aramid pulp of the present invention, and 48% in the known para-aramid pulp available on the market. It is said that a higher filler retention gives better handling properties in the process of producing a friction material. The above-mentioned results demonstrate the high performance of the para-aramid pulp of the present referential example.

EXAMPLE 26

[Production of poly(paraphenylene terephthalamide) by polymerization]

Polymerization of para(phenylene terephthalamide) was carried out by using a 500 ml separable flask equipped with a stirring wheel, a thermometer, a nitrogen inlet tube and a powder feeding hole. After sufficiently drying the flask, 25.63 g of calcium chloride which had been dried at 200° C. for 2 hours was added and then 390 g of NMP was added, and the temperature was elevated to 85° C. After the calcium chloride had completely dissolved, the mixture was allowed to cool to room temperature, and then 12.65 g (0.117 mole) of PPD was added and completely dissolved. The resulting solution was cooled with an ice water having a temperature of about 2°–3° C. When the inner temperature reached 5° C., about ⅓ portion of total TPC to be added (22.74 g, 0.112 mole in the total) was slowly added. Thus, the inner temperature ascended to 8° C. due to the heat of polymerization, and the inner temperature descended to 3° C. after 10 minutes. At this time, about ⅓ portion of the total TPC was slowly added. The inner temperature ascended to 10° C., and again descended to 5° C. after 10 minutes. When the inner temperature reached 5° C., the residual portion of TPC was slowly added. At this time, the polymer solution had an increased viscosity, no violent polymerization took place, and the inner temperature kept a nearly constant value of 5° C. After the complete dissolution of TPC, the mixture was aged at 5° C. for 2 hours. After the aging, the polymer solution (polymer dope) exhibited an optical anisotropy. That is, the solution was the so-called lyotropic solution. The poly(paraphenylene terephthalamide) synthesized by the above-mentioned method had an inherent viscosity of 1.54 dl/g.

EXAMPLE 27

[Production of poly(paraphenylene terephthalamide) by polymerization]

In the same manner as in Example 26, 25.68 g of calcium chloride and 12.65 g of PPD were dissolved in 390 g of NMP. After cooling the resulting solution to an inner temperature of 5° C., a quantity of TPC, a little larger than a ⅓ portion of the total TPC (the total quantity of TPC to be added was 22.84 g, 0.113 mole), was added. Thus, the inner temperature ascended to 22° C., and then descended to 5° C. Fifteen minutes after, the inner temperature had reached 5° C., and then the residual quantity of TPC was slowly added in three portions. While controlling the inner temperature so as to come to 8°–11° C., the mixture was aged. After the aging, the polymer solution (para-aramid dope of low degree of polymerization) exhibited an optical anisotropy. A part of the polymer solution was sampled out and re-precipitated with water to take out a polymer. The poly(paraphenylene terephthalamide) thus obtained had an inherent viscosity of 2.00 dl/g.

EXAMPLE 28

[Production of poly(paraphenylene terephthalamide) by polymerization]

In the same manner as in Example 26, 25.68 g of calcium chloride and 12.65 g of PPD were dissolved in 390 g of NMP. The resulting solution was cooled, and when the inner temperature had reached 14° C., about 1/10 portion of the total TPC to be added (22.62 g, 0.1114 mole) was added. As its result, the inner temperature once ascended to 17° C. and then descended. When the inner temperature had descended to 14° C. in about 5 minutes, another approximately 1/10 portion of the total TPC to be added was added. The above-mentioned procedure was five times repeated, until the quantity of added TPC had reached about a half of the total TPC to be added. The highest inner temperature attained in this period was 19° C. Subsequently, the residual portion of TPC was divided into three equal portions, and added in the same manner as above. The highest inner temperature attained in this period was 16° C. About two minutes after adding the final portion of TPC, the resulting polymer solution showed a phase transition from an optically isotropic solution to a liquid crystal. Subsequently, the mixture was aged at an inner temperature of 16° C. for one hour and the polymer was taken out therefrom in the same manner as in Example 27. The poly(paraphenylene terephthalamide) thus obtained had an inherent viscosity of 1.45 dl/g.

EXAMPLE 29

[Production of poly(paraphenylene terephthalamide) by polymerization]

A polymerization was carried out in the same manner as in Example 28, except that the mean polymerization temperature was elevated from the 16° C. to 20° C. The poly(paraphenylene terephthalamide) thus obtained had an inherent viscosity of 1.45 dl/g. In this polymerization reaction, the inner temperature was 18° C. at the time of charging TPC, and the temperature of aging was 20° C. The inner temperature was in the range of 18° C. to 21° C. on the whole, except that it once ascended to a maximum temperature of 24° C. In this run, too, a phase transition to a liquid crystal took place when about two minutes had passed after adding the final portion of TPC.

EXAMPLE 30

[Production of poly(paraphenylene terephthalamide) by polymerization]

A polymerization was carried out in the same manner as in Example 28, except that the mean polymerization temperature was elevated from the 16° C. to 40° C. In this polymerization, the inner temperature at the time of charging TPC was 38° C., and the aging temperature was 40° C. The inner temperature was in the range of 38° C. to 44° C. In this run, a phase transition to a liquid crystal took place when about one minute had passed after adding the final portion of TPC.

COMPARATIVE EXAMPLE 6

[Production of poly(paraphenylene terephthalamide) by polymerization]

In the same manner as in Example 26, 24.34 g of calcium chloride and 16.87 g (0.1560 mole) of PPD were dissolved in 390 g of NMP. The resulting solution was cooled, and when the inner temperature reached 28° C., about 1/9 portion of the total TPC to be added (30.17 g, 0.1486 mole) was added. As its result, the inner temperature once ascended to 34° C., and then descended. When the inner temperature had descended to 28° C. in about 20 minutes, another approximately 1/9 portion of the total TPC to be added was additionally added. In this manner, TPC was totally added by repeating the above-mentioned procedure nine times. The highest inner temperature attained in this period was 36° C. When about one minute had passed after adding the final portion of TPC, the polymer solution showed a phase transition from an optically isotropic solution to a liquid crystal. Thereafter, the polymer solution gradually increased turbidity. After aging the polymer solution at 30° C. for one hour, a part of the solution was taken out and examined by means of a fluorescent microscope. As its result, deposition of a polymer was observed.

It is suggested from Example 29, Example 30 and Comparative Example 6 that the temperature of polymer deposition varies with the component ratio.

EXAMPLE 31

[Production of poly(paraphenylene terephthalamide) by polymerization]

Polymerization of para(phenylene terephthalamide) was carried out by using a 5 liters separable flask equipped with a stirring wheel, a thermometer, a nitrogen inlet tube and a powder feeding hole. According to the method of Example 26, 265.98 g of calcium chloride and 126.52 g (1.170 moles) of PPD were completely dissolved in 4,000 g of NMP. Then, the solution was cooled until the inner temperature reached 4° C., and 229.50 g (1.130 moles) of TPC was added in 8 portions at time intervals of about 15 minutes. During this period, the inner temperature was kept in the range of 4–8° C., and finally an aging was carried out at 6° C. for one hour. The polymer solution thus obtained (polymer dope) exhibited an optical anisotropy. A part of the solution was sampled out and re-precipitated with water to take out a polymer. The poly(paraphenylene terephthalamide) thus obtained had an inherent viscosity of 1.77 dl/g.

EXAMPLE 32

[Spinning of poly(para-phenylene terephthalamide)]

The para-aramid dope of low degree of polymerization obtained in Example 31 was spun to form a para-aramid fiber. Outline of the spinning apparatus used for this purpose was as mentioned below. Thus, a 3 liters SUS tank kept cool at 10° C. was used as a dope tank, and its inner pressure was elevated to 3 kg/cm$^2$ with dry nitrogen. The outlet of the tank was connected to a gear pump (KAP-1/KA1-0.584, manufactured by Kawasaki Jukogyo K. K.), and the outlet of the gear pump was connected to a spinning die holder through intermediation of a flexible tube. The spinning die had a hole diameter of 70 μm and a hole number of 400. The course of the fiber discharged out of the spinning die was directed with fixed bars made of sapphire, and the draw ratio was controlled by sending the yarn with godet roll. The yarn having passed the godet roll was washed with water and then sent to a winder. The conditions of spinning were as follows: quantity of polymer discharge: 78.3 ml/min. (line speed at the spinning die: 50.9 m/min.); yarn sending speed at godet roll: 48 m/min.; discharge pressure 2.7 kg/cm$^2$G; draw ratio: 0.94. The fiber thus obtained had a fineness of 3.02 d and a tensile strength of 6.2 g/d.

EXAMPLE 33

[Production of poly(paraphenylene terephthalamide) by polymerization]

A poly(paraphenylene terephthalamide) having an inherent viscosity of 1.91 dl/g was produced by carrying out a polymerization using the same apparatus as in Example 31. The polymer solution thus obtained (para-aramid dope of low degree of polymerization) exhibited an optical anisotropy.

EXAMPLE 34

[Spinning of poly(paraphenylene terephthalamide)]

Subsequently, the polymer was spun by using the same apparatus as in Example 32, except that the hole diameter of spinning die was 50 μm and the hole number was 800. The conditions of spinning were as follows: the quantity of polymer discharge: 73.0 ml/min. (line speed at the spinning die: 46.5 m/min.); yarn sending speed at godet roll: 40 m/min.; discharge pressure: 3.9 kg/cm$^2$G; draw ratio: o.86. The fiber thus obtained had a fineness of 1.31 d and a tensile strength of 7.8 g/d.

EXAMPLE 35

[Production of poly(paraphenylene terephthalamide) pulp]

The pulp produced in Example 32 was made into a pulp. The fiber was cut into a length of about 6 mm in the state of wetness, disintegrated by means of a large-sized pulp disintegrator (30 liters) manufactured by Kumagaya Riki Kogyo K. K., and filtered with a metallic wire gauze to separate water from the fiber. The short fiber thus obtained was ten times passed through KRK High Concentration Disk Refiner manufactured by Kumagaya Riki Kogyo K. K. to obtain a pulp. In this procedure, the gap of refiner was preset to 1.4 mm. The pulp thus obtained had a specific surface area of 4 m$^2$/g.

What is claimed is:

1. A para-aramid dope of low degree of polymerization exhibiting an optical anisotropy consisting essentially of 4–10% by weight of a para-aramid selected from the group consisting of poly(paraphenylene terephthalamide), poly(4,4'-benzanilide terephthalamide), poly(paraphenylene-4,4'biphenylenedicarboxylic acid amide) and poly(paraphenylene-2,6-naphthalene-dicarboxylic acid amide), said para-aramid having an inherent viscosity of 1.0–2.5 dl/g and 2–10% by weight of an alkali metal chloride or an alkaline earth metal chloride in a polar amide solvent selected from the group consisting of N,N-dimethylformamide, N,N-dimethylacetamide, N-methyl-2-pyrrolidone and N,N,N',N'-tetramethylurea.

2. A para-aramid dope of low degree of polymerization according to claim 1, wherein said alkali metal chloride or alkaline earth metal chloride is lithium chloride or calcium chloride.

3. A para-aramid fiber obtained by spinning a para-aramid dope of low degree of polymerization according to claim 1.

4. A para-aramid pulp obtained by cutting the para-aramid fiber of claim 3 into a short fiber, mechanically fibrillating the short fiber with a high shearing force, and drying the fibrillated short fiber.

5. A process for producing a para-aramid fiber which consisting essentially of adding 0.94–0.99 mole of a para-oriented aromatic dicarboxylic acid halide to 1.00 mole of a para-oriented aromatic diamine in a polar amide solvent selected from the group consisting of N,N-dimethylformamide, N,N-dimethylacetamide, N-methyl-2-pyrrolidone and N,N,N',N'-tetramethylurea in which 2–10% by weight of an alkali metal chloride or an alkaline earth metal chloride is dissolved, carrying out a polymerization at a temperature of −20° C. to 50° C. to form a para-aramid dope of the para-aramid having an inherent viscosity of 1.0–2.5 dl/g, which exhibits an optical anisotropy and has a para-aramid concentration of 4–10% by weight, and spinning the dope.

6. A process for producing a para-aramid fiber according to claim 5, wherein 0.95–0.98 mole of the para-oriented aromatic dicarboxylic acid halide is added to 1.00 mole of the para-oriented aromatic diamine.

7. A process for producing a para-aramid fiber according to claim 5, wherein said alkali metal chloride or alkaline earth metal chloride is lithium chloride or calcium chloride.

8. A process for producing a para-aramid fiber according to claim 5, wherein said para-oriented aromatic diamine is paraphenylenediamine, 4,4'-diaminobiphenyl, 2,6-naphthalenediamine, 1,5-naphthalenediamine or 4,4'-diaminobenzanilide.

9. A process for producing a para-aramid fiber according to claim 5, wherein said para-oriented aromatic dicarboxylic acid halide is terephthaloyl chloride, 4,4'-benzoyl chloride, 2,6-naphthalenedicarboxylic acid chloride or 1,5-naphthalenedicarboxylic acid chloride.

10. A process for producing a para-aramid pulp which comprises cutting a para-aramid fiber of claim 4 in the water swollen state into a short fiber, mechanically fibrillating the short fiber with a high shearing force, and thereafter drying the fibrillated short fiber.

11. A process for producing a para-aramid dope which consisting essentially of adding 0.94–0.99 mole of a para-oriented aromatic dicarboxylic acid halide to 1.00 mole of a para-oriented aromatic diamine in a polar amide solvent selected from the group consisting of N,N-dimethylformamide, N,N-dimethylacetamide, N-methyl-2-pyrrolidone and N,N,N',N'-tetramethylurea in which 2–10% by weight of an alkali metal chloride or an alkaline earth metal chloride is dissolved, carrying out a polymerization at a temperature of −20° C. to 50° C. to form a para-aramid dope of the para-aramid having an inherent viscosity of 1.0–2.5 dl/g which exhibits an optical anisostropy and having a para-aramid concentration of 4–10% by weight.

12. A process for producing a para-aramid dope according to claim 11, wherein 0.95–0.98 mole of the para-oriented aromatic dicarboxylic acid halide is added to 1.00 mole of the para-oriented aromatic diamine.

13. A process for producing a para-aramid dope according to claim 11, wherein said alkali metal chloride or alkaline earth metal chloride is lithium chloride or calcium chloride.

* * * * *

UNITED STATES PATENT AND TRADEMARK OFFICE
CERTIFICATE OF CORRECTION

PATENT NO. : 5,442,003

DATED : August 15, 1995

INVENTOR(S) : Tsutomu TAKAHASHI et al.

It is certified that error appears in the above-indentified patent and that said Letters Patent is hereby corrected as shown below:

In columns 9-10, Table 2, Example 11, under heading "Form";

change "Optically isotropic" to read --Optically - Liquid isotropic crystal--.

Signed and Sealed this

Twenty-first Day of May, 1996

Attest:

BRUCE LEHMAN

Attesting Officer    Commissioner of Patents and Trademarks